United States Patent

[11] 3,630,485

[72] Inventor Hubert L. Williams
 Hinsdale, Ill.
[21] Appl. No. 40,241
[22] Filed May 25, 1970
[45] Patented Dec. 28, 1971
[73] Assignee Crane Co.
 Chicago, Ill.

[54] BUTTERFLY VALVE SEAT
 5 Claims, 8 Drawing Figs.

[52] U.S. Cl. .................................................. 251/307,
 277/188
[51] Int. Cl. ................................................F16k 1/226,
 F15j 15/16
[50] Field of Search........................................ 251/306,
 307, 170, 171, 172, 173; 277/188

[56] References Cited
 UNITED STATES PATENTS

| | | | |
|---|---|---|---|
| 2,564,025 | 8/1951 | Morton | 277/188 |
| 2,739,855 | 3/1956 | Bruning | 277/188 |
| 2,882,010 | 4/1959 | Bryant | 251/306 |
| 2,988,320 | 6/1961 | Kent | 251/306 X |
| 3,325,142 | 6/1967 | Thompson | 251/306 |
| 3,393,697 | 7/1968 | Fawkes | 251/307 X |

Primary Examiner—Henry T. Klinksiek
Attorney—George S. Schwind

ABSTRACT: A seat structure for butterfly valves in which shim means are inserted between two body rings to adjustably compress a resilient seat axially to thereby effect the desired radial clearance between the internal diameter of the seat and the disc closure member.

Patented Dec. 28, 1971  3,630,485
2 Sheets-Sheet 1
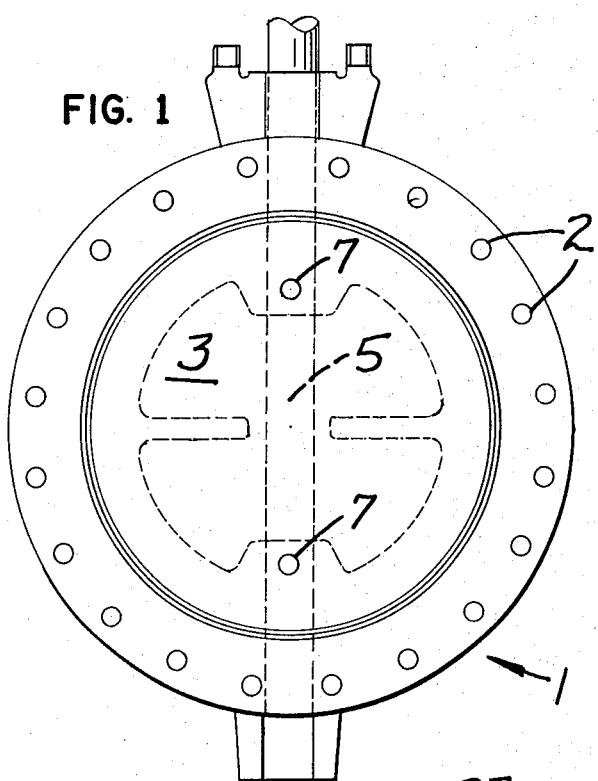
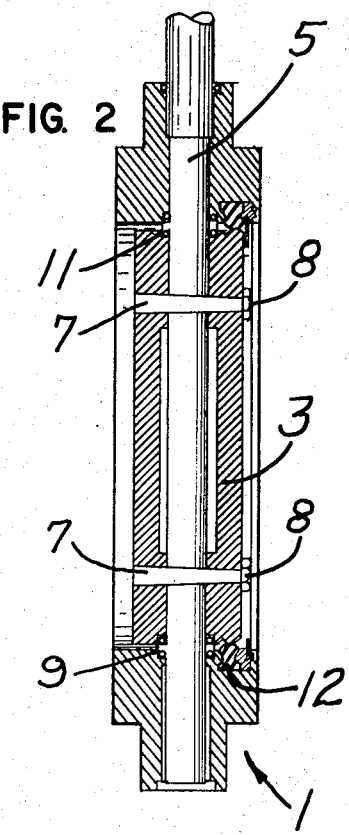
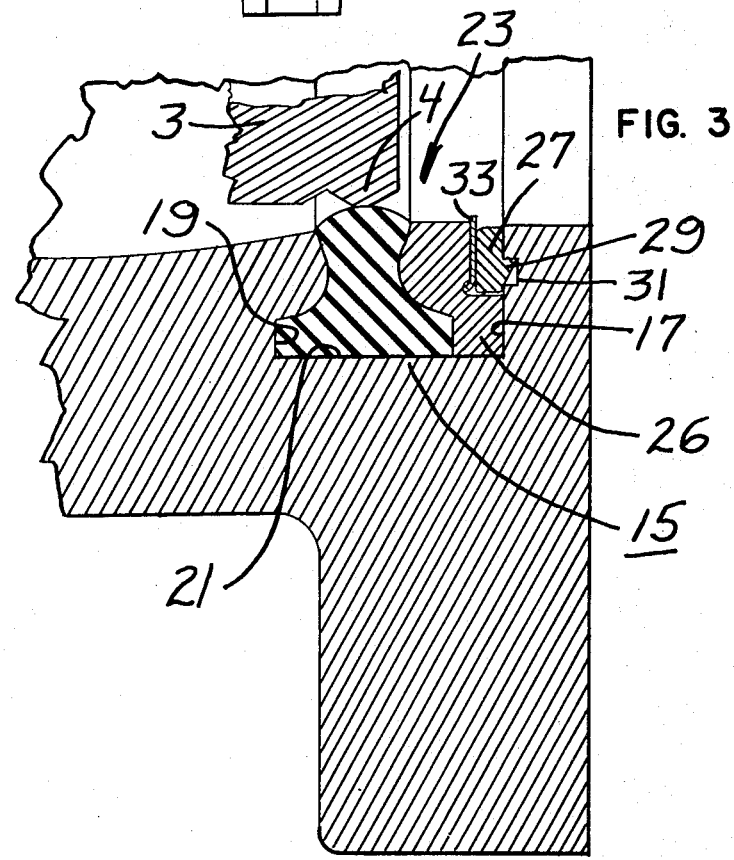

Patented Dec. 28, 1971
3,630,485
2 Sheets-Sheet 2
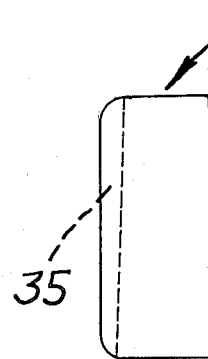
FIG. 4
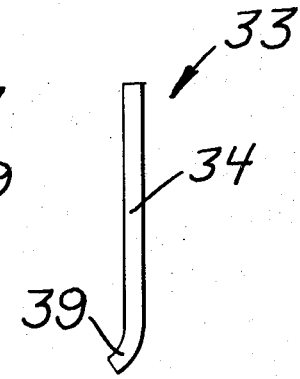
FIG. 5
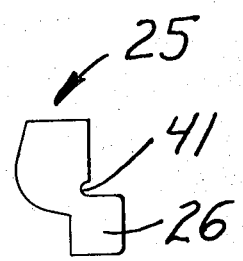
FIG. 6
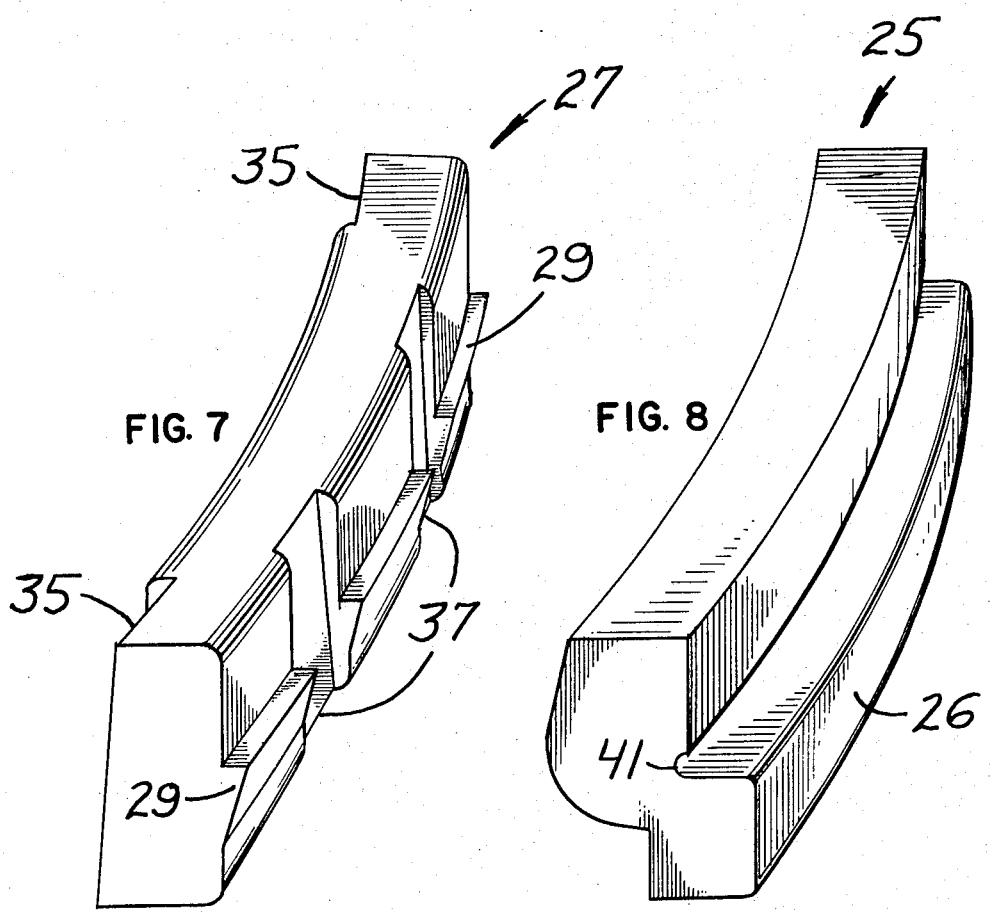
FIG. 7
FIG. 8

3,630,485

BUTTERFLY VALVE SEAT

BACKGROUND AND SUMMARY OF THE INVENTION

This invention relates to butterfly valves and in particular to a novel means for adjusting the clearance between the peripheral edge of the valve disc and the internal diameter portion of the valve seat. The use of butterfly valves in installations necessitating valves having a diameter of several feet directs the requirement for construction of a valve which has an accessible adjusting means and also one which is simple and economical to fabricate and maintain. In installations such as water mains, the valve seats are usually of the molded-in-body type or extruded rubber cut to length. Because of the size of such extrusion it is readily apparent that variations will occur in tolerance of the seat so that final installation of the valve will not be one which will form a tight fit between the periphery of the valve disc and the seat. It is therefore necessary to make such adjustments at a close tolerance so that the leakage across the valve will be kept to minimum both at assembly and after extensive use of the valve.

Numerous ways have been devised to accomplish an acceptable adjusting means for larger type butterfly valves such as grinding or finishing the periphery disc member, and, radially adjustable clamping means which radially vary the inner diameter of the valve seat.

Recent developments in this particular art disclose the use of circumferential, segmental body rings which are inserted in an internal circumferential recess in the valve body. A flexible seat element is also placed within the recess aside of the rings. By separating the rings, with usually some form of screw arrangement, the portion of the seat which is not confined within the recess is compressed so that it expands to contact the outer periphery of the disc closure member since the internal diameter of the seat is reduced by separating the body rings. Conversely, if it is desired to increase the clearance between the seat and disc, the body rings are moved toward each other.

It has been found that such arrangements have an undesirable effect since they are utilizing a form of screw means to effect the separation of the two body rings. Adjustment of the valve seat by such screw means is further undesirable since there is no positive assurance that the seat will remain in such a position subsequent to adjustment. Vibrations, impacts, the flow of fluids through the valve, etc. all tend to loosen such screw settings to thereby disturb the seat tolerance, even if a locking arrangement is used. In addition, the rusting and fusing of such screw means makes subsequent adjustments extremely difficult.

Screw adjusting means are also subject to electrolysis because of the many sharp edges and corners. It also leaves voids which are difficult to coat to thereby prevent electrolysis and corrosion. The shim means disclosed herein a substantially reduces such raids to present a smooth surface that is easily coated and readily protected from such electrolysis and corrosion.

Accordingly, it is the prime object of this invention to provide an adjusting means for such a body ring and seat arrangement which is of positive adjustment that will not deviate from the original setting and one which is not susceptible to disturbance caused by vibration, impact and the like.

A still further object is to provide a valve seat structure which may be adjusted in any desired arcuate location without disturbing the adjustment of other portions of the seat.

A yet further object is to provide a novel adjusting means which is readily calculable since the clearance necessitated in a particular arcuate region may be assumed by the particular shim thickness.

Another object is to provide an improved seat structure whereby the seat clearance may be adjusted without removing either the seat or disc.

The present invention has a novel construction whereby the internal diameter of the flexible seat of a butterfly valve, which is in proximity to the valve disc, may be adjusted at any circumferential location. Such adjustment is accomplished by inserting or removing novel, self-locking shims between body rings, which are positioned in a circumferential recess adjacent the seat, to decrease or increase the valve disc clearance, respectively, depending upon the adjustment desired. At any circumferential location, the body rings may be separated by a novel slot arrangement which permits the insertion of a screwdriver between the two body rings adjacent the seat in the arcuate portion where adjustment is desired. Upon insertion of the screwdriver in its receptive slot, a pressing action separates the two rings to enable the insertion or removal of shims in order to procure the desired seat-disc clearance. Such novel arrangement is inexpensive and may be performed on the valve without removing the disc, seat or associated parts. Also, such adjusting structure enables close tolerances to be maintained without the use of any screws which may become separate from the rings by vibration, or shock, and enter the stream of fluid passing through the valve. Additionally, the shims have a novel offset portion which prevent them from falling instream since they are self-locking and are wedged between the two rings by the forces of the elastomer or flexible seat element which constantly exerts a force to maintain the shims in place.

Other objects and advantages of the instant invention will be apparent from the following description of the preferred embodiment herein described and illustrated in the accompanying drawings.

IN THE DRAWINGS

FIG. 1 is an end view of an assembly of a butterfly valve embodying this invention;

FIG. 2 is a transverse sectional view taken at the centerline of the construction shown in FIG. 1;

FIG. 3 is a magnified, fragmentary sectional assembly view of the novel construction;

FIG. 4 is an end view of one segment of the locking ring;

FIG. 5 is a side view of one of the shims;

FIG. 6 is an end view of one segment of the compression ring;

FIG. 7 is a partial isometric of one segment of the locking ring; and,

FIG. 8 is a partial isometric of one segment of the compression ring.

With reference to the drawings, and in particular FIGS. 1 and 2, an exemplary butterfly valve body of the wafer type, generally indicated by reference numeral 1, is adapted to receive a disc or closure member 3 which is secured to stem 5 by threaded tapered pins 7 and securing nuts 8, or other conventional means. The stem 5 is journaled for rotation in the body 1 by conventional bearings 9 and 11, which may also incorporate sealing means (not shown) in the usual manner. The disc 3 is rotatable between the closed position, wherein the peripheral portion 4 of the disc is in circumferential contact with the flexible seat 12 to effect sealing, as shown in FIGS. 2 and 3, to an open position by rotating the stem 90°, in the conventional manner. In the latter position, no sealing function is performed between the seat and disc. The wafer body 1 has bolt holes 2 equispaced about its outer periphery adapted to receive bolts passed through the body to adjacent pipe flanges (not shown) which are positioned on both sides of the body to thereby secure the body between the flanges in a conventional manner.

The above reference to a cast wafer-type body, which incorporates the novel seat adjusting means hereinafter disclosed, is only exemplary of the numerous types of valve bodies, disc and stem arrangements which may be either cast or fabricated and utilized with the instant invention.

The instant invention is directed to an improved means for effecting the clearance between the periphery 4 of the disc 3 and the flexible seat 12 which is inserted in a circumferential radial groove or recess 15 which is formed of opposing sides 17, 19 and bottom portion 21, as shown in FIG. 3. The recess 15 extends around the entire periphery of the valve and is so positioned as to be normal to the central axis of the valve and in proximity to the disc 3 when the latter is in a closed position, as in FIG. 2.

The recess contains a flexible valve seat 12 of generally T-configuration wherein the leg of the T projects beyond the interior of the valve to permit the disc periphery 4 to contact the seat without interference from the interior of the body 1. The seat 12 is continuous and may be of any elastomer or fluorocarbon capable of flexible distortion and may be constructed of other geometrical cross-sectional configurations if so desired. The seat 12 lies in the bottom of recess 15 whereby one of its sides is positioned against side 19 of the said recess to form complementary mating surfaces, as shown in FIG. 3.

The adjusting means 23 for effecting the adjustment between the seat 12 and disc periphery 4 includes a segmented compression ring 25 which is placed in recess 15 between sides 17 and seat 12. The segmental portions of the ring 25, as shown in FIGS. 6 and 8, are placed in end-to-end relationship around the entire periphery of the said recess so that the seat 12 may be acted on by the ring 25 along the entire circumferential surface to be hereinafter explained.

Positioned between the segmental compression ring 25 and side 17 of recess 15 is a segmental locking ring 27 which overlays an offset portion 26 of the compression ring 25. This locking ring 27, as clearly shown in FIGS. 4 and 7, has a tapered projection 29 extending from the side which is in proximity to side 17 of recess 15. Projection 29 is adapted to snap into a circumferential axial groove 31 which extends around the entire periphery of side 17 of recesses 15, similar to the seat 12, compression ring 25 and locking ring 27. All of these recited elements are thus positioned in recess 15 around the entire inner circumference of the valve body and cooperate to adjust the valve seat.

Positioned between the compression ring 25 and the locking ring 27 are shim means 33, as shown in FIGS. 3 and 5, which are adapted to be inserted or removed between rings 25 and 27 at any circumferential location to thereby permit adjustment between the outer periphery 4 of the disc 3 and seat 12.

With reference to FIG. 3, it is apparent that the compressing ring 25 may be moved axially toward the seat 12 by the addition of shim means 33 inserted between the ring 25 and locking ring 27 since the seat 12 will compress. Upon the insertion of such shim means 33, the ring 25 will be moved axially to thereby squeeze the seat so that the free portion 13, which is not confined and is in proximity to the disc 3, is extruded to thereby decrease the distance between the said seat and disc. Since the seat is confined except for the portion 13, any movement of the compression ring toward the seat will decrease the inner diameter of the seat to thereby decrease the clearance or fit between the disc. Conversely, the removal of shim means 33 between rings 25 and 27 will permit the seat to expand toward the compression ring and relax its confined position thereby increasing the diameter of the seat and the clearance between the disc 3 and adjacent seat portion 13.

With reference to FIGS. 4 and 7, the insertion of shim means is accomplished by placing a screwdriver or similar tool into slot means 35 which are radially positioned at substantially equal intervals around the periphery of the ring 27. By inserting a screwdriver into a slot 35 adjacent a seat area to be adjusted, a leverage may be exerted thereon to separate the rings by compressing the seat an amount sufficient to permit the insertion of the desired thickness shim means between the two said rings. Upon removal of the screwdriver, the elastomer seat will force the rings into position whereby the shim means will have decreased the confined volume of the seat 12 to thereby squeeze a portion of the seat into contact with disc 3. To prevent the shims from falling into the flow of fluid passing through the valve each shim means 33 includes a shank portion 34 and an projection 39, as shown in FIG. 5.

To remove the seat, as for repair or replacement purposes, an additional set of slots 37 are positioned on the side of the locking ring which has the projection 29 thereon. Thus, to initiate removal of the novel seat-adjusting means, a screwdriver is inserted in the slot 37 which is adjacent the sidewall, 17 of recess 15. The locking ring is then separated from the wall by exerting a force on the screwdriver so that the seat is axially compressed a distance sufficient enough to allow clearance of the projection 29 to be released from recess 31. Projection 39 of shim 33 is adapted to be received by a circumferential channel 41 of ring 25 which is in proximity to the projection 39 of ring 25, note FIG. 3. Thus, once the shim means 33 is inserted between the two rings, the projection 39, which comprises a locking means, will prevent the said shim from being dislodged since in order to remove the shim it is necessary to separate the rings 25 and 27 a distance greater than the thickness of the shim's offset portion.

Thus, the novel locking arrangement between the locking ring 27 and body 1, along with the novel locking means 39 of shim means 33, and, the cooperation of these elements with the offset portion 26 of compression ring 25 provide a unique adjusting structure for a butterfly valve seat. Such adjusting means not being susceptible to impact, vibration and undesirable changes in seat-disc clearance.

I claim:
1. A butterfly valve comprising:
   a. a cylindrical valve body, said body having a continuous interior circumferential recess with opposing sidewalls;
   b. a resilient valve seat positioned in said recess adjacent one said wall;
   c. a valve disc rotatively mounted in said body in proximity to said seat;
   d. a pressure ring positioned in said recess adjacent said valve seat and adapted to compress said valve seat, said pressure ring having an offset portion whereby said pressure ring and said one wall overlie portions of said valve seat to prevent said seat from being dislodged from said body recess;
   e. a locking ring positioned in said recess between the other said sidewall and said pressure ring and overlying said offset portion of said pressure ring;
   f. shim means selectively positioned between said pressure ring and said locking ring, said shim means adapted to displace said compression ring toward said seat to thereby squeeze said seat out of said recess into contact with said disc.

2. A valve as claimed in claim 1 wherein said offset portion has a circumferential channel in proximity thereto and wherein said shim means includes locking means comprising a projection on one end thereof adapted to be received by the circumferential recess in said pressure ring to thereby prevent said shims from being accidentally dislodged.

3. A valve as claimed in claim 2 wherein said sidewall adjacent said locking ring includes a circumferential groove, and, said locking ring includes a cam portion adapted to project into said groove to thereby prevent said rings from being dislodged.

4. A valve as claimed in claim 3 wherein said locking ring further includes slot means positioned on opposite sides thereof, said slot means adapted to receive a screwdriver to selectively separate said locking ring from said pressure ring.

5. A valve as claimed in claim 1 wherein said locking and pressure rings are segmental.

* * * * *